United States Patent [19]
Gloudeman et al.

[11] Patent Number: 6,119,125
[45] Date of Patent: Sep. 12, 2000

[54] SOFTWARE COMPONENTS FOR A BUILDING AUTOMATION SYSTEM BASED ON A STANDARD OBJECT SUPERCLASS

[75] Inventors: Jeffrey J. Gloudeman, Franklin; Donald A. Gottschalk, Wauwatosa; David E. Rasmussen, Dousman; Barrett G. Wainscott, Jr., Waukesha, all of Wis.

[73] Assignee: Johnson Controls Technology Company, Plymouth, Mich.

[21] Appl. No.: 09/054,696

[22] Filed: Apr. 3, 1998

[51] Int. Cl.[7] .................................................. G06F 17/30
[52] U.S. Cl. ..................... 707/103; 707/104; 709/301; 364/528.01
[58] Field of Search ...................... 707/103, 104; 709/303, 301, 302; 364/528.11, 528.01, 474.24, 475.07, 475.09, 528.16, 528.17

[56] References Cited

U.S. PATENT DOCUMENTS

| | | | |
|---|---|---|---|
| 5,862,052 | 1/1999 | Nixon et al. | 364/468.24 |
| 5,916,306 | 6/1999 | Ruiz | 709/242 |
| 5,918,233 | 6/1999 | La Chance et al. | 707/104 |
| 6,028,998 | 2/2000 | Gloudeman et al. | 717/1 |

OTHER PUBLICATIONS

"An Intelligent Dynamic Simulation Enviornment: An Object–Orinted Approach, " Robinson et al., Proceedings of the 1988 IEEE Symposium on Intelligent Control, Aug. 24, 1988, pp. 687–692.

"Object–Oriented Chemical Process Modeling in Omola, " Nilsson, Proceedings of the 1992 IEEE Symposium on CACSD, Mar. 1992, pp. 165–172.

"An Autonomous Decentralized System Platform under Multi–vendor Environments in Building Automation, " Orihara et al., Proceedings of the 1997 IEEE International Symposium on Autonomous Decentralized Systemss, Apr. 1997, pp. 409–415.

*Primary Examiner*—Hosain T. Alam
*Attorney, Agent, or Firm*—Quarles & Brady LLP; George E. Haas

[57] ABSTRACT

A computer-implemented building automation system provides a computer software architecture that supports object-oriented system development. An application engineer designs an application to perform a building automation function that solves a problem or customer need in the context of a building automation system. In the object-oriented paradigm, standard objects are the fundamental building block used to construct an application. Based on predetermined physical relationships defined by physical laws associated with building automation functions, the present invention defines a fundamental set of control-based standard objects for constructing an application. An additional set of information-type standard objects have also been defined for use in conjunction with this set of control-based standard objects. Standard objects are interconnected by "pulling" or "pushing" information from one standard object to another standard object using common communication methods. Assembly objects and application objects are two additional types of user-defined standard objects for interconnecting standard objects, thereby constructing a building automation application.

8 Claims, 8 Drawing Sheets

FIG. 1
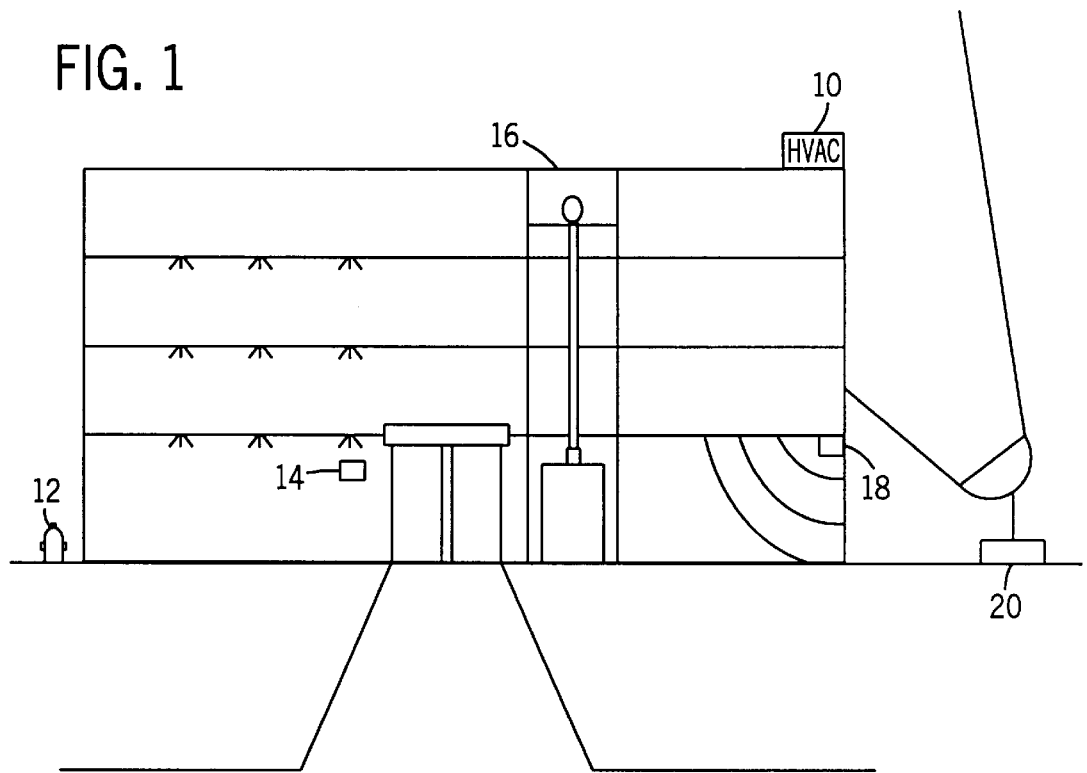
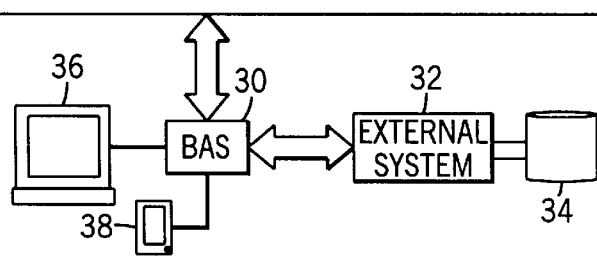

SOFTWARE COMPONENTS FOR A BUILDING AUTOMATION SYSTEM BASED ON A STANDARD OBJECT SUPERCLASS

BACKGROUND OF THE INVENTION

The present invention relates generally to building automation systems. More particularly, the invention relates to an object-oriented software system for constructing building automation applications with minimal hardware dependency.

Traditional building automation systems are designed, from the ground up, according to the type and physical requirements of the devices and controllers used in the system. This conventional approach makes today's building automation systems highly device-dependent and controller-dependent. Being device-dependent, conventional systems are difficult to enhance and often stubbornly resist integration with new technologies.

The present invention avoids such hardware dependency by providing a collection of specially designed software components that may be assembled to construct complex and sophisticated building automation applications. The software components are self-contained and portable, each encapsulating different fundamental aspects of larger building automation systems. The software components are designed to work together, communicating with one another through common communication methods. Specifically, the software components encapsulate many of the common physical properties and physically constrained functionality, leaving the system designer or system integrator free to define the application-specific details. The collection of software components provided by the invention allows the system integrator to assemble applications without worrying about the details of the underlying physical system constraints. The system integrator is thus able to build application-centric building automation systems largely without any hardware dependencies.

SUMMARY OF THE INVENTION

A computer-implemented building automation system provides a computer software architecture that supports object-oriented system development. An application engineer designs an application to perform a building automation function to solve a problem or customer need in the context of a building automation system. In the object-oriented paradigm, standard objects are the fundamental building block used to construct an application. Based on predetermined physical relationships defined by physical laws associated with building automation functions, the present invention defines a fundamental set of control-based standard objects for constructing an application. An additional set of information-type standard objects have also been defined for use in conjunction with this set of control-based standard objects. Standard objects are interconnected by "pulling" or "pushing" information from one standard object to another standard object using common communication methods. Assembly objects and application objects are two additional types of user-defined standard objects for interconnecting standard objects.

For a more complete understanding of the invention, its objects and advantages, reference may be had to the following specification and to the accompanying drawings.

BRIEF DESCRIPTION OF THE DRAWINGS

FIG. 1 is a diagrammatic view of a building environment, illustrating the building automation system of the invention in an exemplary application;

DESCRIPTION OF THE PREFERRED EMBODIMENT

Figure 2:
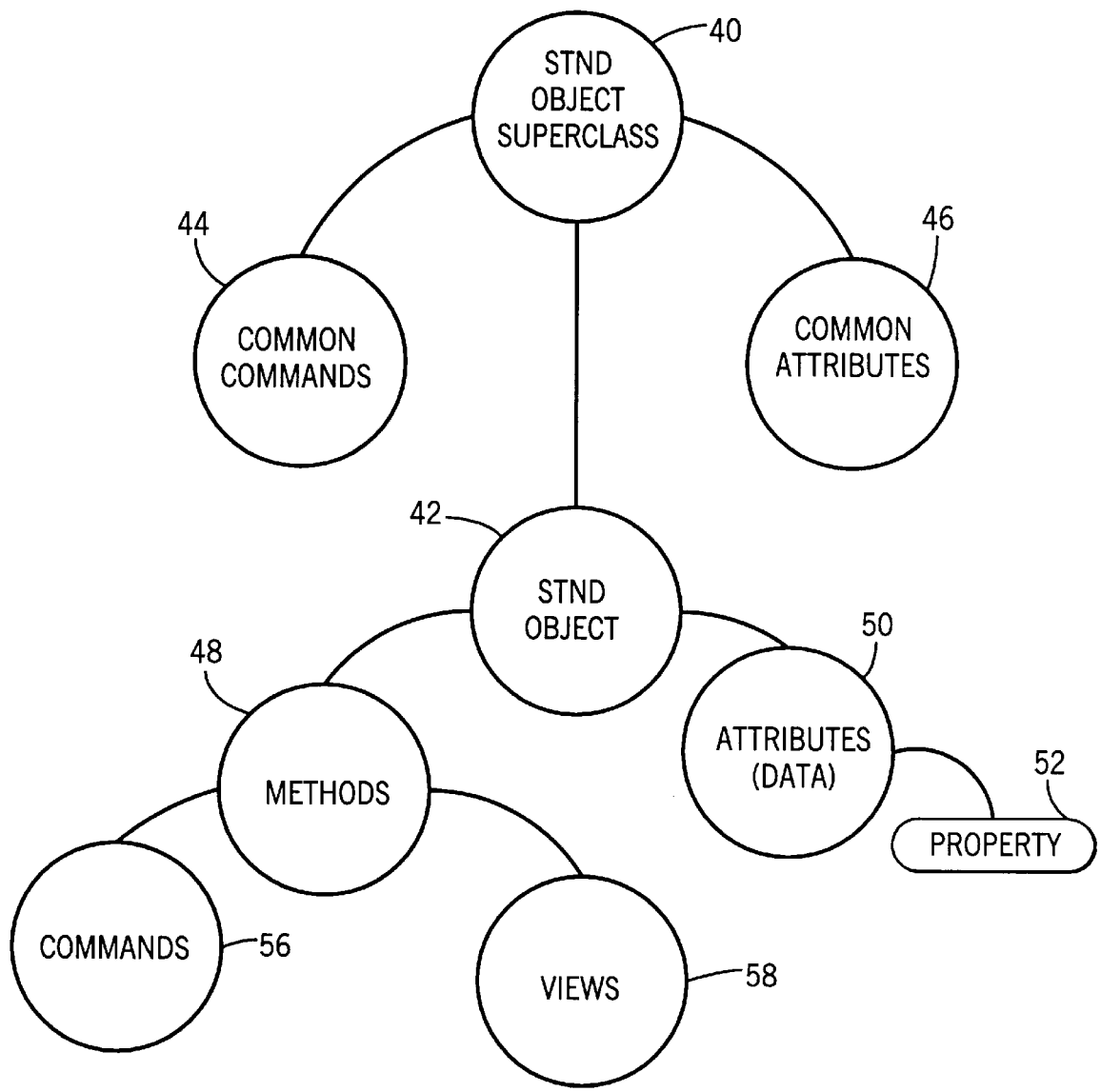
FIG. 2 is a common object model diagram illustrating the preferred superclass design employed by the building automation system.

The building automation system of the invention provides a computer hardware and software architecture that supports powerful object-oriented system development. The building automation system can be used to monitor, collect data and control a multitude of different facilities management devices and applications. By way of illustration, FIG. 1 shows an exemplary facilities management application within a building that includes a heating and cooling system 10, fire alarms and sprinkler system 12, security system 14, elevator control system 16, intrusion alert system 18 and lighting control system 20. Although not explicitly illustrated, the exemplary facilities management application will typically also include such other building system services as sewer and water, waste management, landscape irrigation and maintenance, parking lot and sidewalk maintenance, and physical plant inventory control.

The building automation system 30 of the invention is designed to electronically communicate with the aforementioned building systems, either by direct hardwire connection or through wireless communication; or, by accessing information stored in data files maintained by other systems within the facility. As an example of the latter, the building might have an existing heating and air-conditioning (HVAC) system that must be integrated into the system of the present invention. Such an external system, illustrated at 32, can be readily connected to the building automated system 30 through the third party interface provided by the building automated system 30. The external system 32 may include its own information storage component such as database 34. The building automation system 30 of the invention maintains several data stores and provides the data migration capability to obtain and store information originally found in database 34 by communicating with external system 32. The building automation system 30 also provides an user interface through which the human operator can interact with the building automation system through a variety of different user interfaces. To illustrate some of the possible interfaces, a monitor 36 and a personal digital assistant (PDA) 38 have been illustrated. These user interface devices can be connected to the building automation system by wire, wireless communication, local area network (LAN), wide area network (WAN), or some other suitable communication means, such as a telephone connection or the Internet.

A standard object is the fundamental building block or software component used by the application engineer to construct a building automation system in the present invention. In the object-oriented paradigm, a class hierarchy defines through inheritance from a superclass a plurality of classes from which standard objects are created through instantiation. These standard objects encapsulate, and thereby hide, implementation details so that the user creates applications in terms of the desired system functionality. FIG. 2 shows the class hierarchy illustrating various aspects of the standard object in the present invention. An actual standard object as distributed on a controller would be an instance of this object class.

Referring to FIG. 2, the presently preferred embodiment defines a standard object superclass 40 from which each standard object 42 is derived. The standard object superclass defines a plurality of common commands 44 and a plurality of common attributes 46. In object-oriented parlance, the common commands are methods that the standard object is capable of performing and the common attributes are data that the standard objects are capable of storing. In other words, all standard objects include common commands 44 and common attributes 46, by virtue of inheritance from superclass 40.

In addition to the common commands and common attributes, a standard object may also have additional methods 48 and attributes 50 that correspond to object-specific details. Attributes, themselves, are defined according to a predefined hierarchy. Specifically, attributes are defined in terms of a set of properties 52 that are used to describe how the attribute is defined and to specify other characteristics about the attribute. Methods 48 are the logic sequences performed by the object on its attributes.

Methods 48 provided by each object include two important components: a view component 58 and a command component 56. The view component stores methods that are specifically defined to display different sets of predefined attributes in different predefined ways. The view component encapsulates the logic needed to display certain information on the user interface so that this aspect of providing information to the user does not have to be specifically programmed into the user interface.

The command component provides a somewhat related function with respect to certain methods of the standard object that are available for execution through the user interface. Commands represent a subset of the available methods defined in an object. Commands are methods that are visible to outside objects, and to the user interface, so that they can be executed by another object or from the user interface by sending a message to the object.

An application metaphor is used to design the building automation system of the present invention. The user creates an application to solve a problem or customer need. The definition of an application is independent of the controller set which will implement that application. The software architecture, in turn, must be designed to allow implementation of the metaphor. The architecture must be consistent across all devices on the network to ensure that they communicate and operate in a similar fashion. In addition, the architecture must also be scaleable, that is, the same architecture must be able to function on a small controller as well as an operator workstation. It should be noted that not all devices (e.g., mechatronic devices) will be required nor able to implement all portions of the model, but rather will be determined by the applications which that device must support. However, it is highly desirable that devices which support common applications support the same subset of the model to implement those applications. If these devices do not support the same portions of the model, then duplicate application engineering may be needed to create the same set of applications for each device.

To implement this application metaphor, the architecture for the building automation system is based on a standard set of standard objects which the application engineer has available to construct these applications. Standard objects are grouped according to their primary use at the control layer and information layer of the architecture.

Generally, the architecture includes hardware and software standard objects. Hardware objects are associated primarily with the control layer of the architecture. Hardware objects provide a means to decouple the physical hardware devices and the software objects. More specifically, hardware objects provide methods to convert hardware inputs (e.g., resistive sensed temperature) to a digital value (e.g., 25 degrees F.). Although the reuse of physical hardware components is encouraged, hardware cost structures and the use of third-party hardware is driving this decoupling. Again, the building automation applications are insulated from the technology (in this case, input/output hardware circuitry).

Software objects can reside at both the information and control layers of the architecture. For certain software objects, there is a one-to-one relationship to a hardware object (e.g., Analog Input Hardware to Analog Input Software). These software objects are designed to handle digital values from the hardware and/or other software objects.

Generally, control layer standard objects are based on predetermined physical relationships defined by physical laws associated with the building automation functions. The following set of control-type standard objects are provided:

| Standard Object Type | Description |
| --- | --- |
| Analog Input (Hardware) | Ranged value that matches a sensor's output |
| Analog Input (Software) | Receives a usable value from analog input hardware object |
| Analog Output (Hardware) | Scaled output value generated by the hardware |
| Analog Output (Software) | Provides scaled output to analog output hardware object |
| Analog Value | Maps an analog attribute to a component |
| Binary Input | Logic value that matches a measured quantity or contact state |
| Binary Output | On/Off momentary, maintained or pulsed output |
| Binary Output Sequencer | Sequences staged binary equipment |
| Binary Value | Maps a binary attribute to a component |
| Connection | Maps attributes between components |
| Duration Adjust Output | Pulse width modulated output in response to an analog input |
| Device | Defines the characteristics of the physical device |
| Electric Heat Sequencer | Sequences staged electric binary equipment |
| Latch | Stores a Boolean event as its output |
| Multistate Input | Provides an integer output (0 through 7) based on the state of the eight inputs |
| Multistate Output | Controls 0 to n binary outputs in response to a 0 to n-1 input |

| Standard Object Type | Description |
| --- | --- |
| Multistate Value | Maps a multistate attribute to a component |
| P-Adaptive | Proportional adaptive controller |
| Position Adjust Output | Positional or Incremental control through two binary outputs |
| PID | Proportional + integral + derivative loop |
| PRAC | Pattern Recognition Adaptive Controller self-tuner |
| Ramp | Controls an output at a linear rate to gradually start equipment |
| Simple Finite State Machine | Discrete event controller |
| Start-Stop Output | Binary output with feedback |
| Stepper Motor Output | Represents the externally visible characteristics of a stepper motor |
| Timer | Time based functions for use in various control strategies |
| Two-State Digital Output | Represents the externally visible characteristics of a physical two-state digital output |
| Two-State Digital Input | Represents the externally visible characteristics of a physical two-state digital input |

Some additional information-type standard objects have also been defined for use in conjunction with this set of control-type standard objects. Information standard objects facilitate the interaction between control standard objects and/or any more complex building automation applications derived from these control standard objects. These information standard objects are as follows:

| Standard Object Type | Description |
| --- | --- |
| Access | Defines a user's security clearance for the system |
| Analog Alarm | Alarm logic for an Analog Input or any analog value |
| Analog Totalization | Integrates analog attribute value over time |
| Binary Alarm | Alarm logic for a Binary or Multistate |
| Calendar | Defines the current system date |
| DLLR Controller | Reduces electrical utility expenses by selectively shedding electrical loads |
| DLLR Load | Manages electrical power per each piece of equipment |
| Event Totalization | Counts events or pulses over time |
| Group | A container for system components |
| Heavy Equipment Controller | Prevents large peaks in electrical demands |
| Integrator | Provides an interface to third-party object sets |
| Interlock | Issues commands to objects based on object events |
| Multistate Alarm | Provides alarming capability with respect to normal condition |
| Notification | Sends a message and values to a list of user interfaces |
| Optimal Start/Stop | Adjusts the start/stop times of equipment |
| Printer | Sends system information to a hard copy device |
| Pulse Totalization | Counts pulse made by binary attribute values over time |
| Query | Collects object attribute values based on filter criteria |
| Rate Calculator | Monitors its input attribute and calculates a rate of change |
| Report Filter | Defines the criteria for report delivery to system devices |
| Runtime Totalization | Integrates time while input object's value matches a state |
| Schedule | Issues commands to objects on a time schedule |
| Serial Data Link Layer | Allows a device to communicate through its serial ports |
| Site | Responsible for synchronization between other objects |
| Summary Object | Executes standard and user-defined summaries |
| Trend | Collects object attribute values on a periodic or event basis |

Fundamental building automation functions can be modelled from this set of standard objects. The definition of each of these standard object types includes its own unique set of attributes as well as methods for achieving that object type's specific function. A standard object is preferably indivisible, in that it does not consist of any smaller components as far as the application engineer is concerned. In other words, the application engineer is not able to decompose a standard object to create new objects. Each instance of a standard object is designed to reside on a single device. In this regard, the term device includes not only building automation devices (ie. programmable controllers or sensors), but also any computer-human interfaces provided by the system. Additional detail for each of these Standard Objects are described below.

Information is communicated by passing messages between these standard objects. Objects are capable of processing messages directed to them from other objects, such that each object type defines methods which are executed to process each message it supports. Methods for "pulling" information and for "pushing" information from one standard object to another standard object are amongst the minimum set of messages each object must support.

Figure 3:
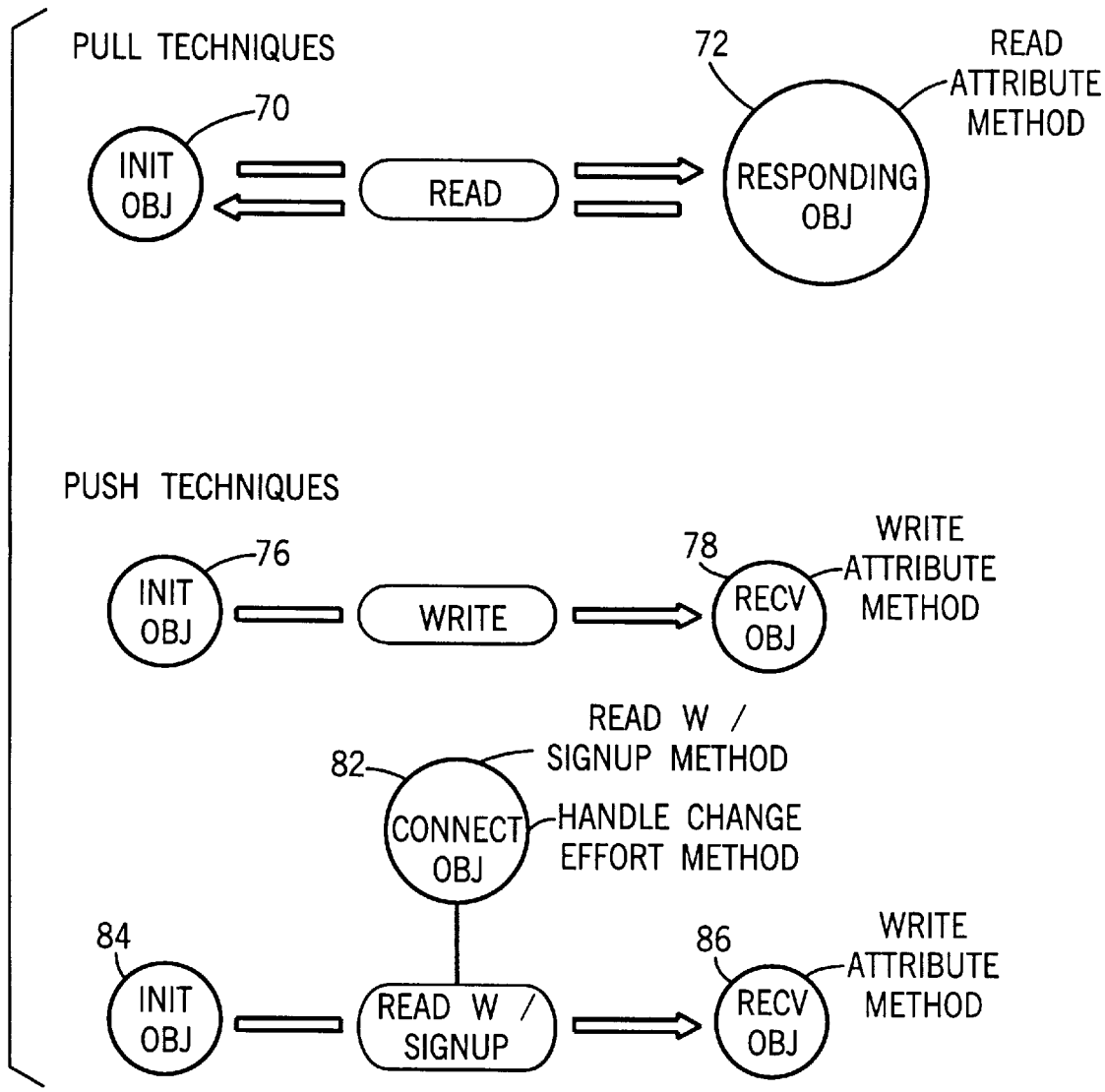
FIG. 3 is a diagram showing primary communication techniques for interconnecting standard objects in the building automation system.

The common communication techniques of the present invention and their associated methods are illustrated in FIG. 3. To pull information, each standard object supports a Read Attribute method. A message may be sent by an initiator object 70 to request the value of one or more of the attributes from a responding object 72. The Read Attribute method associated with responding object 72 will respond to the requesting message with a return message that is formatted with the current data type and value of the requested attribute. In this case, initiator object 70 serves as the destination for the requested information, and thus has in effect "pulled" the information from another responding standard object.

On the other hand, standard objects may "push" information using either of two techniques. First, an initiator object 76 may send a write attribute request message to a receiving object 78. Receiving object 78 is asked to set one or more of its attributes to a new value as indicated in the request message. Using a Write Attribute method, receiving object 78 handles the message request and updates its corresponding attribute values.

Second, a connection object 82 is a type of standard object that uses a Read with Signup method to implement asynchronous change of value (COV) communication. Connection object 82 essentially establishes the communication link between an initiator object 84 and a receiving object 86, such that each instance of connection object 82 contains a data structure for passing attribute information from one object to another object. A Read with Signup method is used by connection object 82 to register a request with initiator object 84 to be informed of changes in the value of its requested attributes. In this case, a changed attribute message is sent to connection object when the value of the requested attribute changes in initiator object 84. In turn, connection object 82 updates the requested attribute value in receiving object 86 by using a Write Attribute method. In each of these two cases, the initiator object sends or "pushes" the requested information to another receiving standard object. In summary, it is through these communication methods that standard objects are interconnected to form a building automation system of the present invention.

In general, this message scheme will be used by standard objects to communicate between devices. Internal to a device, the method for "sending" messages/data between standard objects may vary. For example, on a small controller message passing may be done via memory addresses, while on a supervisory controller with a multitasking operating system, intertask messaging may be employed. Regardless of the implementation detail, each standard object will support the basic "pull" and "push" communication methods described above.

Standard objects are designed to be downloaded onto building automation devices in the system to serve as independent, standalone entities. However, standard objects also serve as the basic components used to construct assembly objects or application objects. Assembly objects and application objects are two additional types of user-defined standard objects. These objects represent the main containers for constructing building automation applications. Generally, assembly objects and application objects are interconnected using the above described "pull" and "push" communication methods.

The Application object is an object type created by the user for the purpose of collecting standard objects, assemblies, and other applications into a single object container. This collection of objects defines the components of an application. The application can also provide connections between the component objects, have user defined attributes and a control logic sequence. The application object can then be used as a stand-alone object, or as a component of another application. An application defines a new object type with a new class id and an attribute set of its own. Its purpose is to combine objects in the system to solve a problem or meet a customer need.

The Application object can specify direct connections between its component objects which allow these objects to execute asynchronously. Alternately, the logic method of the Application object can control and sequence the execution of the component objects. This same control logic method can be responsible for propagating values from one object component to another, instead of using the direct object connections. In addition, the component objects of an Application can be distributed to different devices on the network. The Application can also access objects that are outside of the Application.

To the user of an Application, from the system level, it will look like any other standard object. It will have a set of attributes that can be viewed and written. A difference from other objects is that the user can penetrate into the application to view the component objects. The components of an application are available to other applications. That is, their attributes may be read/written by the logic sequences of other applications. This includes components of nested applications as well as components of the "top level" application.

The Assembly object provides for a user-defined object type to be created by combining standard objects and a control logic sequence. The Assembly object type can then be used as a stand-alone object, or as a component of an application. An assembly defines a new object type with a new class id and an attribute set of its own. Its purpose is to create new object types that can be used in the system as if they were pre-defined object types.

The Assembly object can be under the complete control of the control logic sequence that is defined as part of the object. This control logic sequence can be responsible for propagating values from one object component to another, and for the execution of the object components. This will allow the Assembly to provide efficient and consistent sequential execution of all components. The Assembly object designer can also specify direct connections between Assembly attributes and component objects, or between component objects directly.

To the user of an Assembly, from the system level, it will look like any other standard object. It will have a set of attributes that can be viewed and written. When the Assembly executes, the user can expect the attributes to change in a consistent manner. As with other standard objects, the user cannot penetrate into the object to view the component objects. The user will be unaware that these components even exist.

The designer of the Assembly does have access to the internal components of Assemblies and the logic sequence that controls them. An exception to this will be Assemblies that are distributed as part of the product tool library that have the "locked" attribute set. When this attribute is set, it has been determined by a designer that this object contains proprietary algorithms that may not be viewed by users.

Figure 4:
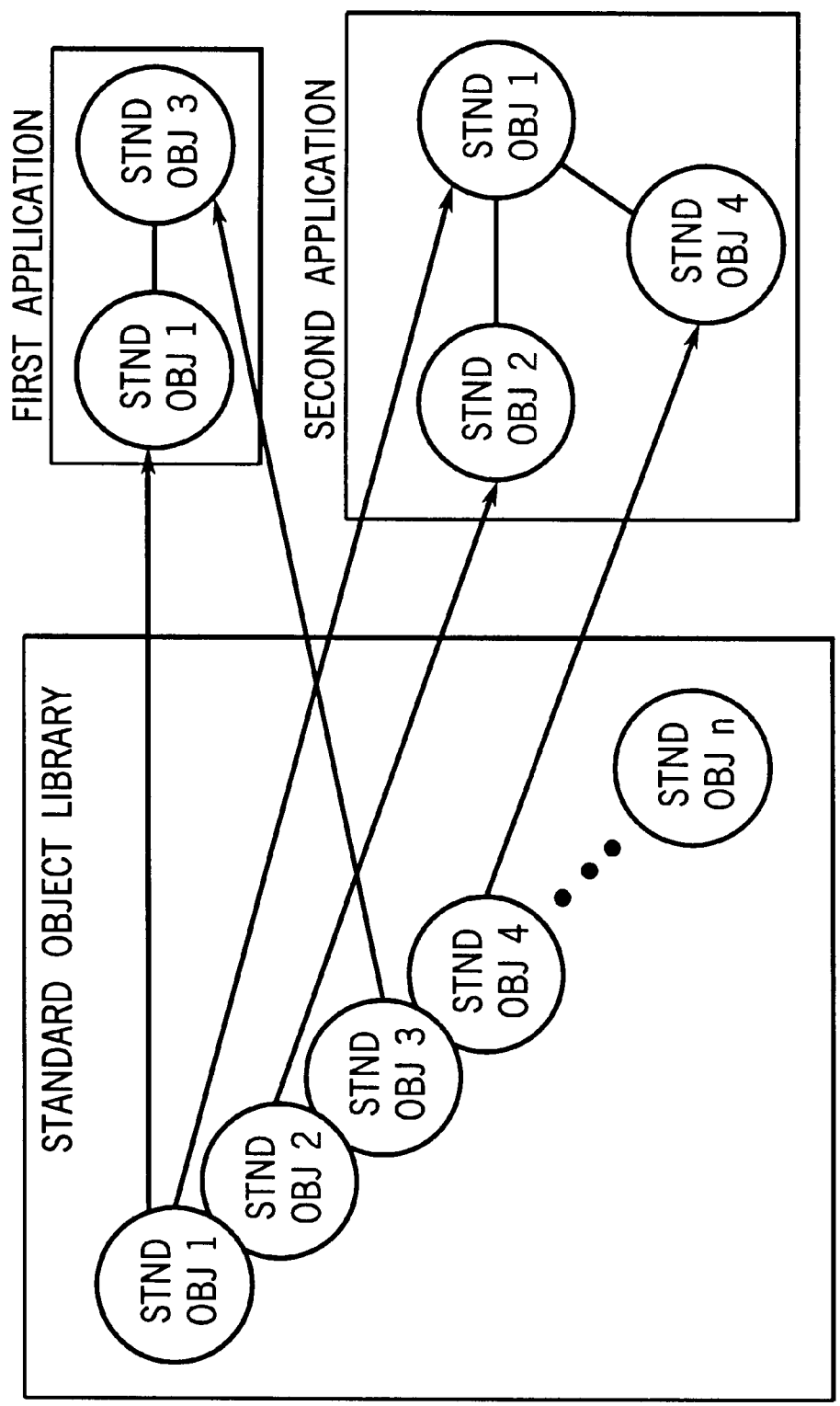
FIG. 4 is a block diagram showing standard objects being interconnected to form exemplary applications for use in the building automation system of the invention.

Referring to FIG. 4, each of the standard objects 90 may reside in a standard object library 92 of an object-oriented based development tool as would be known to one skilled in the art. From this set of standard objects 90, an application engineer may construct various applications for performing building automation functions. For instance, a first application 94 is constructed from a first standard object 96 and a second standard object 97 which are interconnected 98 to each other by one of the above described communication techniques. In this manner, an application engineer could construct various types of standard software components (ie. standard objects, assembly objects or application objects) using the fundamental set of standard objects.

Figure 5:
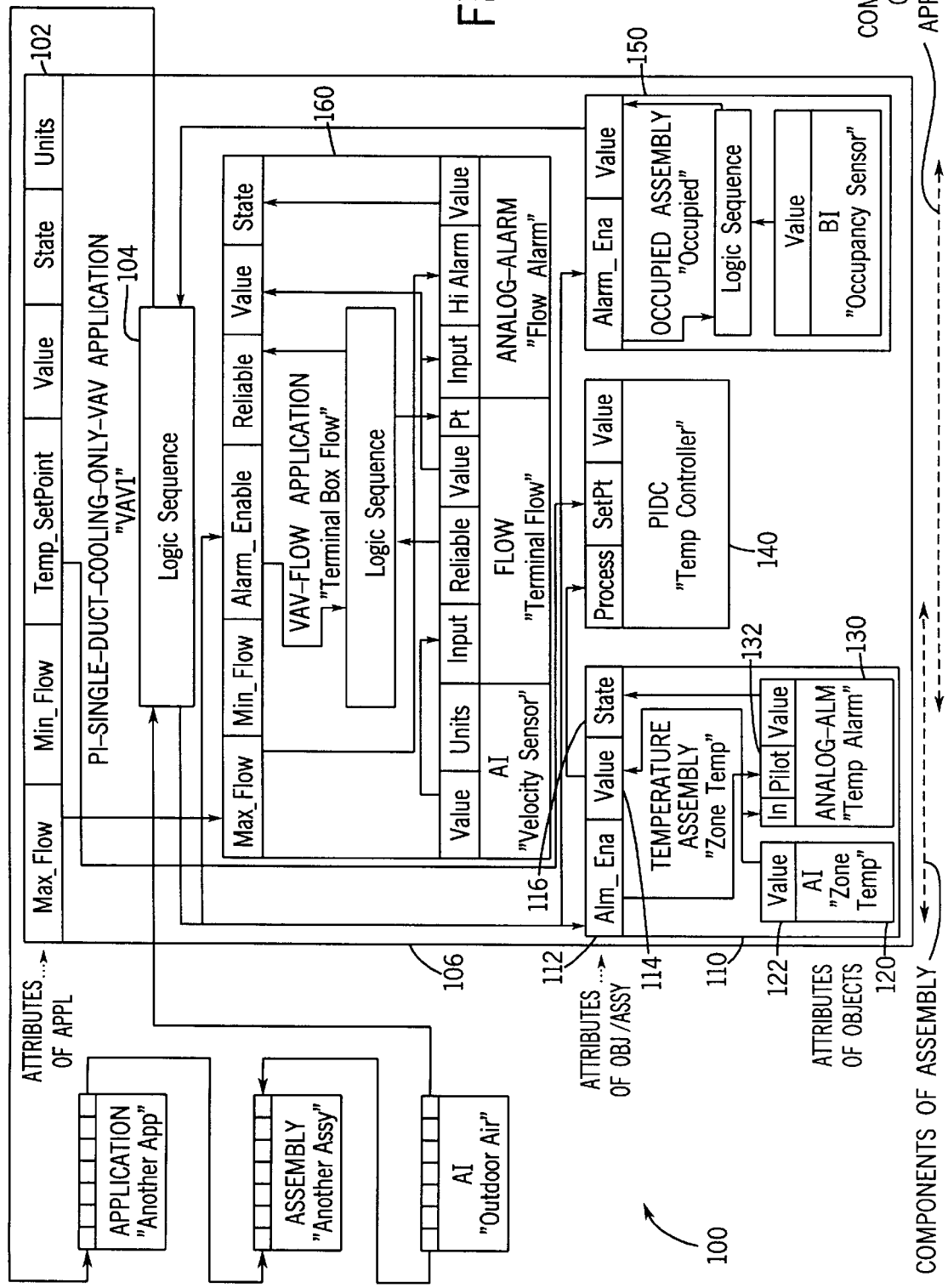
FIG. 5 is a diagram illustrating an exemplary variable air volume (VAV) application constructed from standard software components for use in the building automation system of the invention.

By way of example, a variable air volume (VAV) single duct cooling application 100 being constructed from numerous standard software components is shown in FIG. 5. This figure illustrates how standard objects, assembly objects and application objects are combined and interconnected to construct a building automation application. An application engineer understanding the functions relating to a VAV application would begin to construct this application from the above described set of control and information standard objects.

For instance, an Analog Input standard object 120 for detecting a zone temperature is combined with an Analog Alarm standard object 130 to form a Temperature assembly object 110. The VAV application 100 sets the Alarm Enabled attribute 112 of Temperature assembly object 110 which in turn is sets the Pilot attribute 132 associated with Analog Alarm object 130. The Temperature value attribute 122 of Analog Input object 120 is interconnected as an input to Analog Alarm object 130 and an output of Temperature assembly object 110. When the zone temperature value exceeds a threshold value established by Analog Alarm object 130, a State attribute 116 of Temperature assembly object 110 is set by virtue of a connection to Analog Alarm object 130. Temperature value attribute 114 and State attribute 116 of Temperature assembly object 110 can then be interconnected to other standard objects, assembly objects or application objects that comprise VAV application 100.

Temperature assembly object 110 is only one of the standard software components comprising VAV application 100. A PID standard object 140, an Occupied assembly object 150 and a nested VAV Flow application object 160 are also embedded into VAV application 100. Like Temperature assembly 110, Occupied assembly 150 and VAV Flow application 160 are constructed from standard objects consisting of a Binary Input object, and an Analog Input object, a Flow object and an Analog Alarm object, respectively. In addition, to these standard objects, each of these assembly objects are also designed to include attributes and a logic sequence.

After creating each of these standard software components, an application engineer can then define an attribute structure 102 and a logic sequence 104 that interconnects/interacts with each of these individual software components to provide VAV application 100. Typical applications, including rooftop unit control, air handling unit control, chiller plant control and fan coil control, would also be constructed from a set of standard objects in this manner for use in the building automation system of the present invention.

The Analog Input Hardware Object provides a calibrated reading of what is connected (wired) to its physical input terminals, whether it be Resistance, Voltage or Current. For example, the Analog Input Hardware object provides an analog to digital conversion of a resistive input to value useable by the Analog Input Software object.

The Analog Input Software object receives a value and reliability from the Analog Input Hardware object. This value is typically in the electrical units of the input (e.g., Ohms, Amps or Volts) depending upon the input type. The Analog Input Software object linearizes this value within the reliability limits of the particular input type. The linearization function converts the value into the units of the measured media (i.e., degrees, % humidity, inches of water gauge). An unreliable value, after linearization, will be passed directly to the present value output.

If a reliable linearized value is calculated, an amplitude and/or frequency domain sub-filter may optionally be applied to further condition the linearized input. The amplitude domain sub-filter consists of an adaptive anti-spike filter. The frequency domain sub-filter can be user selected as a $1^{st}$ or $2^{nd}$ order low pass filter. If the process fails anywhere along the way, the unfiltered linearized value is passed.

The digital anti-spike sub-filter clips signal spikes and glitches in the sampled signal obtained from the Hardware Analog Input. Signal spikes and glitches can be caused by a brief communications failure, spurious electrical signals in the sensor environment, or an intermittent instrumentation fault. Clipping will prevent large incorrect values from being passed on to other objects.

After clipping, the signal can be passed through either a $1^{st}$ or $2^{nd}$ order low pass sub-filter. The $1^{st}$ order filter is a simple exponential filter and the $2^{nd}$ order filter is a Butterworth filter. The Butterworth filter has the additional capability to reject noise above the frequency dictated by the process physics. The highest frequency which can be removed by the Butterworth filter is limited by the fastest sampling rate. The default cutoff frequency is determined by the analog input sample rate.

When the Analog Input Software object is "decoupled" from the Analog Input Hardware object, attributes of the Analog Input Software object will not be effected by changes reported by the Analog Input Hardware object. The Analog Input Software object will retain information reported by the Analog Input Hardware when decoupled for eventual use. The Analog Input object is decoupled only on any of the following conditions:

1. During the startup period (use the value of the Startup__Value attribute).
2. A write to the Present__Value attribute is active at any priority (1 to 16).
3. Out__Of__Service attribute is TRUE.
4. Enabled attribute is FALSE.

The Analog Output Hardware object defines the set of functions and attributes to represent the externally visible characteristics of a physical Analog Output point. This object provides a means to interface to the physical output hardware on the device that it is running on and is not normally visible by the user.

The Analog Output Software object provides a scaled output value to an Analog Output Hardware object. The Present__Value attribute is spanned to form the Output attribute. The Present__Value attribute spans between the Min__Out__Value and Max__Out__Value attributes when the Present__Value attribute is between the Min__Value and Max__Value attributes.

The Analog Value object defines a standardized object whose attributes represent the externally visible characteristics of an analog value. An "analog value" is a control system parameter residing in the memory of a device. This parameter may assume any real (e.g., floating point) number.

The Binary Input Software object defines the functionality and attributes that represent the externally visible characteristics of a physical binary input point. The Binary Input Software object connects to a Two State Digital Hardware Input object. The Two State Digital Input Hardware object provides the software object with the indication of the signal the hardware is sensing.

When the Binary Input Software object is "decoupled" from the Two State Digital Input Hardware object, attributes of the Binary Input Software object will not be effected by changes reported by the Two State Digital Input Hardware object. The Binary Input Software object will retain information reported by the Two State Digital Input Hardware when decoupled for eventual use. The Binary Input Software object is decoupled upon any of the following conditions:

1. During the startup period (use the value of the Startup__Value attribute).
2. A write to the Present__Value attribute is active at any priority (1 to 16).
3. Out__Of__Service attribute is TRUE.
4. Enabled attribute is FALSE.

Figure 6:
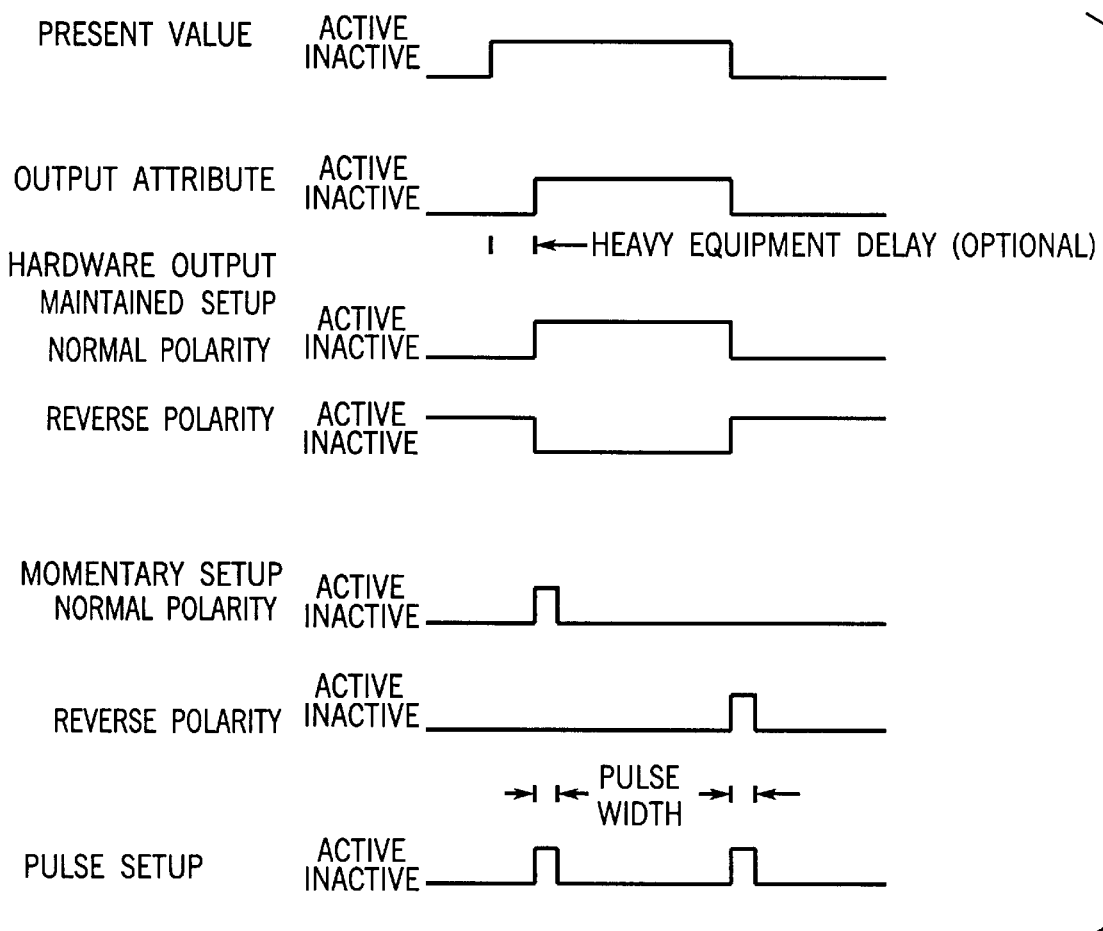
FIG. 6 shows the output setup for a Binary Output object.

The Binary Output Software Object defines the functionality and attributes that represent the externally visible characteristics of a physical Binary Output point. The Binary output can be setup to be either Maintained, Momentary, or Pulse as shown in FIG. 6.

A Binary Output can be setup to provide one of three types of hardware outputs. With the Maintained setup, the output follows the Present__Value attribute. With the Momentary setup, the output goes Active for a duration specified by the Pulse__Width attribute each time the Present__Value attribute transitions from the Inactive to the Active state or Active to Inactive state depending on the polarity. With the Pulse setup, the output goes Active for a duration specified by the Pulse__Width attribute each time the Present__Value attribute transitions from either the Inactive or Active state.

The Binary Output Sequencer object manages the sequencing of Binary Output, Start-Stop, or other objects that support a binary input signal. To allow this object to interconnect with other logic, the output states are also readable.

The Binary Output Sequencer object accepts a proportional command and generates stage information in either a proportional or integrational form (determined by the Setup attribute).

Proportional—Under Proportional operation, the magnitude of the Input attribute determines the stage of operation. Each stage is activated when the input exceeds the Make Limit defined for that stage and deactivated when the input is less than or equal to the Break Limit for that stage. The input command is valid between 0% and 100%. The configuration tools define a set of Make/Break Limits for each stage defined in the Binary Output Sequencer object.

Two rules apply to the definition of Make/Break Limits for the Binary Output Sequencer. For every stage, the Make_Limit must be greater than the Break_Limit. Also, all Make_Limits must be in ascending order and all Break_Limits must be in ascending order.

Integrational—Under Integrational operation, the Present_Value is determined according to the following method. The Input command is valid between 0% and 100%. One Make_Limit and one Break_Limit is established to determine the requests for more or fewer stages. As long as the Input is greater than the Make_Limit, an additional stage is requested, and as long as the Input is less than the Break_Limit, one less stage of capacity is requested. One rule applies to the definition of the Make and Break Limits: the Make_Limit must be greater than the Break_Limit.

Once the Present_Value is determined, all Interstage On or Off delays must be satisfied before the Actual_Stage can become the Present_Value, and its compliment of outputs are energized. The state of the outputs are also reflected in the Output_State array of Multistate values. This allows applications to create interlocks with other devices and logic, i.e. the Fan must be ON whenever a stage of Electric Heat is ON.

This logic adds the Interstage On and Off delay timers between each of the established stages. The logic compares the Present Value from the Analog to Stage Sequence Logic to the Actual Stage feedback from the Output Timing Logic. The logic ensures that the Interstage On and Off timers are not triggered until the Output Timing Logic timers have been satisfied. The output of this logic is the Desired Stage which is the driving input to the Stage to Output Assignment Logic.

The Binary Output Sequencer object supports three combinations of Stage to Output Assignment Logic to meet the total breadth of sequencing applications. The supported scenarios include:

1. The number of Stages equals the number of Outputs, and the output combinations through a sequence up are the same as the output combinations on the way down.
2. The number of Stages is greater than the number of Outputs, and the output combinations through a sequence up are the same as the output combinations on the way down.
3. The number of Stages is greater than the number of Outputs, and the output combinations through a sequence up are different than the output combinations on the way down.

This logic applies the Minimum On, Off and Cycles Per Hour (CPH) timing logic to the Desired Outputs established by the Stage to Output Assignment Logic. The outputs values from this logic are interfaced to either Binary Output, Assembly, or Start-Stop Objects.

The Cycles per Hour (CPH) attribute has the highest priority over all the output timing logic when it is applied. The CPH timing logic is only applied when the value is set greater than 0. This logic is typically required for refrigeration applications to ensure that an individual compressor does not cycle on and off more than the specified setting regardless of the Min_On and Min_Off timing. When the CPH value is greater than 0, it is divided into the 60 minute time base to establish the base output cycle duration. For example, a system with a CPH setting of 6 establishes a 10 minute time base for the cycling on and off of the output. Within the 10 minute time base, minimum on and off timers could be established at 3 minutes each. However, the 10 minute time base will always hold an output off even if the minimum on and off timers have been satisfied within the CPHs 10 minute range.

This logic also determines the Actual Stage Value based on the individual stage timing attributes. The Actual Stage Value provides the required feedback to the Interstage Timing Logic to ensure the interstage timing logic is not triggered until the Output Timing Logic is processed. The Instant Off Input is integrated with this logic to bypass all the Binary Output Sequencer timers and turn off all the Output Values.

The Binary Value object type defines a standardized object whose properties represent the externally visible characteristics of a binary value. A "binary value" is a control system parameter residing in the memory of a device. This parameter may assume only one of two distinct states. In this description, those states are referred to as Active and Inactive.

The Connection Object is an internal object that is never seen and does not need to be named because it is generated automatically by the compiler. When data needs to be passed asynchronously between two objects, the Connection Object is used. It essentially keeps track of the connection between the source and destination object.

The Connection object is supported in devices that provide Change Of Value (COV) processing of attributes. If the sign-up database in the controller is full, the Connection object will have a Reliability status of CONNECTION_FAILED and the input attribute will not be updated.

The Connection Object can only be connected to a source whose attribute and data type is triggerable. A sign up for a change of value report from the source object is issued from the Connection Object. When the source produces a COV, the connection object writes this value to the destination attribute at which time any conversions are performed. Data types which are converted by the connection object include: Boolean, Byte, Unsigned Integer, Unsigned Long Integer, Signed Integer, Float, and Double Precision Float.

The Duration Adjust Output object accepts an analog input (0 to 100 percent) to create a "pulse width modulated" output signal. A digital output will be Active (on) for the Present_Value input percentage of the object's Period. It will be Inactive (off) for the remainder of the Period.

The Duration Adjust Output object provides "pulse width modulated" control of a digital output. The digital output will be high for the Present_Value input percentage of the Period and it will be low for the remainder of time. If the Present_Value input is lower than a Min_On_Limit percentage (or greater than a Min_Off_Limit percentage), the digital output goes low (high).

If the Present_Value goes to zero, the digital output immediately goes low (any currently Active pulse is immediately canceled).

The Device object defines the attributes that represent the externally visible characteristics of a device. There is exactly one Device object in each device. When a device is delivered from the factory it contains, at a minimum, a Device object.

The Device object is responsible for device level functions including maintaining device status and manufacturing information, handling class code and object instance load processes, locating objects within the device, and responding to network 'pings' which verify communications are still operational between two devices.

The Electric Heat Sequencer object manages the proper sequencing of one or more stages of electric heat. The operation of this object is functionally similar to the Binary Output Sequencer, but simplified for use with electric heat applications.

The EHS object accepts a proportional command and generates stage information in either a proportional or integrational form (determined by the Setup attribute).

Proportional—Under Proportional operation, the magnitude of the Input attribute determines the stage of operation. Each stage is activated when the input exceeds the Make Limit defined for that stage and deactivated when the input is less than or equal to the Break Limit for that stage. The input command is valid between 0% and 100%. The configuration tool defines a set of Make/Break Limits for each stage defined in the EHS object.

Two rules apply to the definition of Make/Break Limits. For every stage, the Make_Limit must be greater than the Break_Limit. Also, all Make_Limits must be in ascending order and all Break_Limits must be in ascending order.

Integrational—Under Integrational operation, the Present_Value is determined according to the following method. The Input command is valid between 0% and 100%. One Make_Limit and one Break_Limit is established to determine the requests for more or fewer stages. As long as the Input is greater than the Make_Limit, an additional stage is requested, and as long as the Input is less than the Break_Limit, one less stage of capacity is requested. One rule applies to the definition of the Make and Break Limits: the Make_Limit must be greater than the Break_Limit.

Once the Present_Value is determined, all Interstage On or Off delays must be satisfied before the Actual_Stage can become the Present_Value, and its compliment of outputs are energized. The outputs are connected to Two State Digital Output Hardware objects. The output objects are referenced via Slot indexes. The state of the Two State Digital Output Hardware objects is also reflected in the Output_State array of Multistate values. This allows applications to create interlocks with other devices and logic (i.e., the Fan must be ON whenever a stage of Electric Heat is ON).

The Electric Heat Sequencer Object has the same number of Outputs as it does Stages.

The Latch object stores a binary event until the object is reset. The Latch object is designed to work with a momentary Reset and Input. A trigger of the Input or Reset attributes cause the object to execute. The Present_Value attribute of the Latch object is determined by the following table:

| Reset | Input | Present_Value |
|---|---|---|
| 0 | 1→0 | no change |
| 0 | 0→1 | 1 |
| 1 | 1→0 | 0 |
| 1 | 0→1 | 0 |

-continued

| Reset | Input | Present_Value |
|---|---|---|
| 1→0 | 0 | no change |
| 1→0 | 1 | 1 |
| 0→1 | 0 | 0 |
| 0→1 | 1 | 0 |

The Multistate Input object gives an integer output (0 thru 7), based on the states of the eight inputs. The input (one at a time) handles a basic rotary switch and reads the closed state of up to eight inputs to provide eight output states. The output is unreliable if none of the connected inputs (Input 1 through the Feedback_Input) are on or if more than one of the connected inputs are on. The Feedback Input is optional. When Feedback_input is present, it is the confirmation that the other inputs (Input 1 through Input 7) are off. If an input is not connected, its corresponding output state is unattainable. The following table shows the results:

| Input 1 | Input 2 | Input 3 | Input 4 | Input 5 | Input 6 | Input 7 | Feedback Input | MI OUTPUT |
|---|---|---|---|---|---|---|---|---|
| Off | Off | Off | Off | Off | Off | Off | On | 0 |
| On | Off | Off | Off | Off | Off | Off | Off | 1 |
| Off | On | Off | Off | Off | Off | Off | Off | 2 |
| Off | Off | On | Off | Off | Off | Off | Off | 3 |
| Off | Off | Off | On | Off | Off | Off | Off | 4 |
| Off | Off | Off | Off | On | Off | Off | Off | 5 |
| Off | Off | Off | Off | Off | On | Off | Off | 6 |
| Off | Off | Off | Off | Off | Off | On | Off | 7 |

The physical inputs are not required to be in consecutive order. The output is a multistate value from 0 to 7. The user can assign a dictionary reference to describe the eight states.

Figure 7:
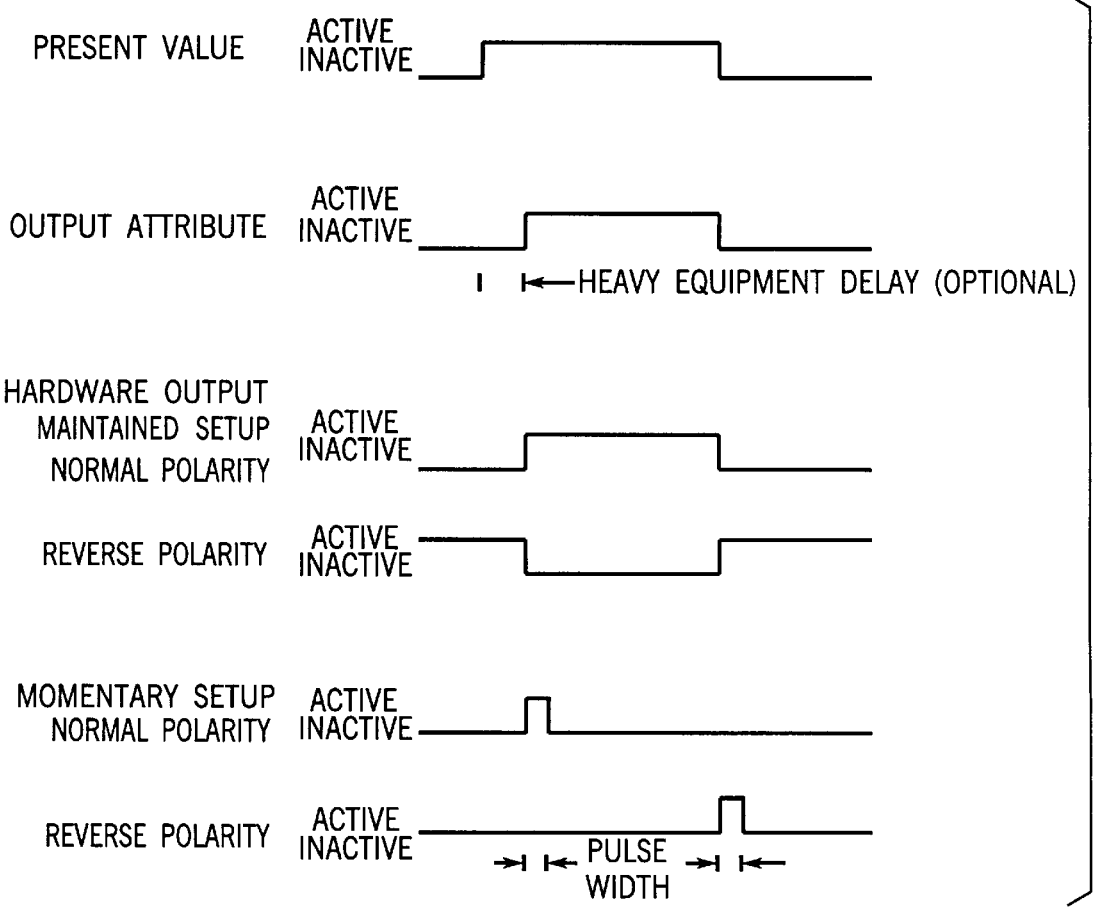
FIG. 7 shows the output type for a Multistate Output object.
Figure 8:
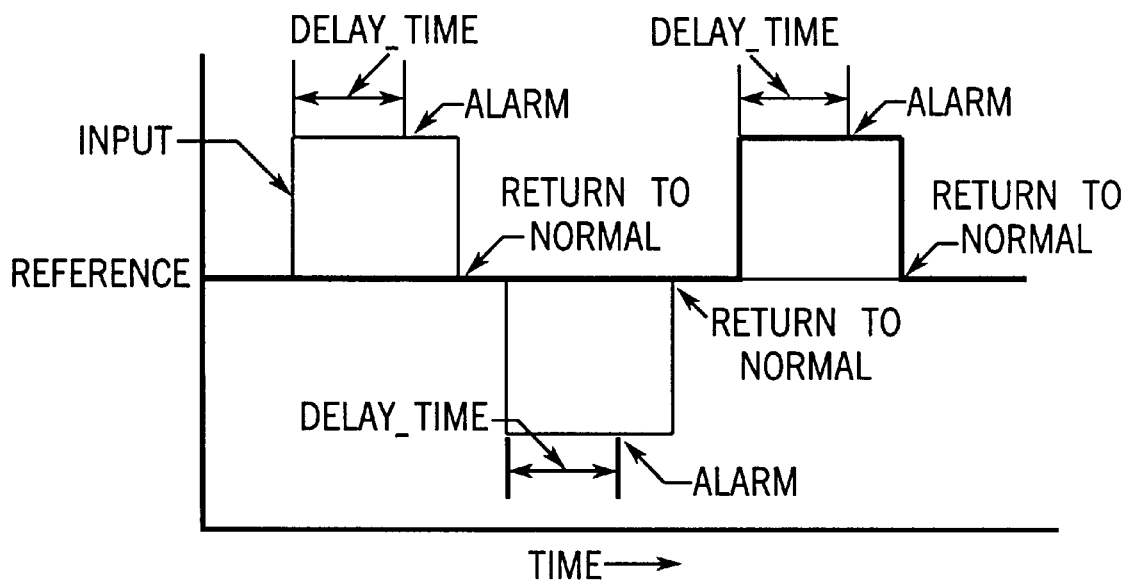
FIG. 8 illustrates a delay time being applied on a transition from a normal condition to an alarm condition in the Binary Alarm object.

The Multistate Output object controls up to eight binary outputs in response to a 0 to 7 input. The output type may be either momentary or maintained as shown in FIG. 7. A Multistate Output can be setup to provide one of two types of hardware outputs. With the Maintained setup, the output follows the Present_Value attribute. With the Momentary setup, the output goes Active for a duration specified by the Pulse_Width attribute each time the Present_Value attribute transitions from the Inactive to the Active state or Active to Inactive state depending on the polarity.

The input is a multistate (integer) value in the range of 0 to 7. This function generates up to eight outputs. When defined to control maintained outputs, the MO has seven binary outputs and controls each as described:

| Input | BO1 | BO2 | BO3 | BO4 | BO5 | BO6 | BO7 | BO8 |
|---|---|---|---|---|---|---|---|---|
| 0 | off | off | off | off | off | off | off | off |
| 1 | on | on | off | off | off | off | off | off |
| 2 | off | off | on | off | off | off | off | off |
| 3 | off | off | off | on | off | off | off | off |
| 4 | off | off | off | off | on | off | off | off |
| 5 | off | off | off | off | off | on | off | off |
| 6 | off | off | off | off | off | off | on | off |
| 7 | off | off | off | off | off | off | off | on |

For the maintained type, the hardware is configured such that each state 1 through 7 has a normally closed contact, interlocked such that only one state can be driven at one time. The state 0 has a series of normally closed contacts such that state 0 is active only when all other states are inactive. The configuration requires n−1 relays where n is the number of states.

For the momentary type, the hardware is configured such that each state 1 through 7 has a normally open contact, interlocked such that only one state can be pulsed at one time. The state 0 has two physical outputs. A normally open contact and a normally closed contact which are interlocked to remove power from all other states when active. This configuration requires n relays where n is the number of states.

The Multistate Value object type defines a standardized object whose properties represent the externally visible characteristics of a multistate value. A "multistate value" is a control system parameter residing in the memory of a device. The Multistate Value object provides a means to map up to 256 different states to an object.

The P-Adaptive object utilizes a new flow control algorithm for systems with constant-rate actuators. The flow control algorithm uses a fixed gain, proportional-only feedback design which takes advantage of the integrating effect provided by incremental motor actuators. The PVDC (proportional variable deadzone controller) provides proportional-only control with a variable deadzone non-linearity that is based on an estimate of the variance of the flow measurement noise. This new flow controller results in superior, stable operation given the non-linearity of flow through a damper or valve with no parameters that need to be tuned.

The Position Adjust Output (PAO) object controls an Incremental actuator which does not provide position feedback. The Setup attribute of the object provides the actuator control options of either Positional or Incremental. The output of this object is the current estimated position in percent of the Stroke_Time of the actuator. The estimated position of the actuator is calculated by the PAO object. This object is typically connected to a pair of Two State Digital Output Hardware objects to increase or decrease the position of the actuator.

When the PAO object is configured as positional, its Present_Value expresses the desired actuator position. This Present_Value is compared to the current calculated Output position of the actuator and a time proportional command is sent to either the Increase or Decrease Digital Output Hardware object. The Output attribute is updated upon a read of that attribute and also upon execution of the object. An overdrive function is used to synchronize the PAO and the actuator. When the Present_Value is at 0% or 100%, the PAO will drive the actuator to 0% or 100%, and then overdrive an additional amount to ensure the endstop is reached. The amount of overdrive is limited by the value Resync_Amount per Resync_Period.

When the PAO object is configured as Incremental, its Present_Value expresses the amount of movement desired from its current position. The sign of the Present_Value determines the direction of movement. The magnitude of the Present_Value determines the amount of movement desired. A time proportional command is sent to either the Increase or Decrease Digital Output Hardware object. Overdrive is not performed on a PAO object that is configured as Incremental.

The purpose of the PID object is to maintain the variable that is being controlled (Process Variable) close to the desired value (Setpoint) in spite of disturbances or variations of the process dynamics. It is based on the most common control algorithm (PID) used for closed loop systems (systems with a feedback). It calculates the control action in response to the difference (SP−PV) between the desired Setpoint and the Process Variable. So it can be configured as:

Proportional (P)—the action of the controller is proportional to the error.

Proportional and Integral (PI)—the action of the controller is proportional to the current error and the integrated error. The integral action is added to the proportional output to guarantee the Process Variable reaches the setpoint in steady state.

Proportional, Integral and Derivative (PID)—the controller's output is proportional to the current error, the integrated error, and to the time derivative of the process variable. The derivative action is added to improve the closed-loop stability. Due to process dynamics, the controller may not respond quickly to an error. Derivative control improves performance by predicting the process output via linear extrapolation.

The algorithm also contains anti wind-up to avoid the saturation of the actuator under control and Bumpless Transfer to avoid a bump in the control signal when there is a switch between the Automatic and Overridden modes or a change in the controller Gain setting. The PID object can be used as a standalone object or as a part of the PID Controller.

The Pattern Recognition Adaptive Controller (PRAC) object provides a new method for automatically adjusting the gain and integral time of proportional-integral (PI) controllers based upon patterns that characterize the closed-loop response. PRAC provides near-optimal performance for a range of systems and noise levels. Also, the algorithm is computationally efficient and does not have large memory requirements.

The Ramp object controls an output at a set linear rate to gradually start equipment. The Ramp object has a Max_Ramp_Time to ramp its output from the current value to the control input value. The Ramp passes the Control input signal to the output when: the Max_Ramp_Time has expired or the Present_Value reaches the control value or the Ramp_Status attribute="pass through". The Ramp's step size is a function of how often the ramp runs, the Max_Ramp_Time and the difference between the Control input and the Starting_Value.

When the Ramp_Requested attribute is set, the timer gets set to the Max_Ramp_Time, and the Ramp saves the Starting_Value. The Starting_Value could be the current output, if so specified. At each iteration of the Ramp, the output of the Ramp function is:

$$\text{Starting\_Value} + \text{Elapsed\_Time}/\text{Ramp\_Time} \times (\text{Control\_Input} - \text{Starting\_Value})$$

Each successive iteration increments the output by the appropriate value.

The Simple Finite State Machine (SFSM) object is a discrete event controller. A state is an abstract representation of a mode of operation for a control system. The Current_State is the active state of a finite state machine. A state machine has more than one state but only one current state. The action taken while the SFSM is in a specific state is defined by an Output_Function. Each state can have a unique output function.

The Next_State is the state that is the destination for a transition. A table of next state functions (Transition Conditions) defines a set of rules describing the current state and the rules required for a transition to occur. The current state becomes the state shown as the next state if a transition occurs. A state machine has at least one transition into and one transition out of each state.

The rules for a transition to occur can be a combination of Event(s) and/or Guard_Conditions(s). An event is a transient occurrence associated with the rising edge of some Boolean expression (e.g., a PI loop has just saturated high). An event is valid for only one evaluation of the state machine, then it is forgotten. A guard condition is a system status that is valid for each evaluation of the state machine that it is true (e.g., Zone Temperature>Cooling Setpoint).

The SFSM object supports the implementation of a multi-level hierarchical state diagram. Each state in the upper levels, also called a Superstate, may contain multiple substates that are described by a flat State Transition Diagram. A flat state transition diagram is a graphical representation of the states and transitions for a given superstate. An extended state transition diagram is used to depict the transitions between states not in the same superstate. Five types of transitions may occur between superstates and substates.

1. A transition between substate and substate. This is the typical transition illustrated in a flat state transition diagram.
2. A transition from a substate to a superstate. This indicates that the default substate for that superstate should be entered if the transition is valid.
3. A transition from a superstate to a substate. This indicates that, if the transition conditions are valid, the transition should be taken if the current state is any of the substates of the indicated superstate.
4. A transition from a superstate to a superstate. This indicates that, if the transition conditions are valid, the transition should be taken if the current state is any of the substates of the starting superstate. The default substate for the ending superstate should be entered if the transition is valid.
5. A transition from a superstate or substate to a history state.

The state machine will return to the last active state for the governing superstate.

The SFSM object is instantiated with the Next_State table and is scaled for the number of inputs, states, and transitions. The execute method of the SFSM object is run whenever the input to the object changes. The object compares the current inputs and the current state against each transition in the table. A transition to a Next_State is made as appropriate, and the object updates the Present_Value and the Transition Log accordingly.

The Start-Stop Output object accepts a logical input and controls two 2-state Digital Output Objects based on that input. On a transition of the Present Value from Inactive to Active, the Start Digital Output Hardware object will activate for a period equal to the Pulse_Width. On a transition from Active to Inactive, the Stop Digital Output Hardware object will activate for a period equal to the Pulse_Width.

A Start Stop Output pulses the Slot_A output when the Present_Value attribute transitions from Inactive to Active. The Slot_B output is pulsed when the Present_Value attribute transitions from Active to Inactive. This action is reversed when the Polarity attribute is set to Reverse.

The Stepper Motor Output object type defines a standardized object whose properties represent the externally visible characteristics of a Stepper Motor. The present value of this object is the desired setpoint position in percent of the full stroke of the actuator or a desired change in position.

There are two setup modes of the Stepper Motor Output object, Positional and Incremental. When Setup=Positional, the Stepper Motor Output object receives the Present Value representing the desired actuator position. This value is converted to an absolute target position in motor counts, and then into a Delta Count position.

Target Position (Counts)=Present Value(%)*Full Range(Counts)

Delta Count=|TargetPosition(Counts)−PresentPosition(Counts)|

When Setup=Incremental, the Stepper Motor Object receives a Present Value that represents the magnitude of movement and direction the actuator should travel. The magnitude is converted into a delta count (ie., DeltaCount= |Present Value (%)*Full Range (Counts)|). The object then drives the Phase A and Phase B I/O signals to the motor drive circuit (clockwise or counter-clockwise) until the Delta-Count is zero. Using a stall feedback signal from the motor drive circuit, the Stepper Motor Output object is able to:

Determine its full stroke range in motor counts
Re-synchronize itself to account for drift
Provide diagnostics (e.g., calibration errors, stall errors, direction errors)

The Timer Object provides general time base functions for use in various control strategies. The Timer Object accepts a binary value, and requires various configuration attributes for operation. A Reset signal cancels any Timer operations in process. It can be configured to also re-trigger the Timer. The Timer object creates a binary wave output that depends upon the configured Timer type and the values set in the timer's attributes. Timer resolution is a minimum of 1.0 second for all timer values.

The Pulse (non-cancelable) timer begins on the first leading low to high change of the input, and runs for the time specified, ignoring any further input changes until the time expires.

The Retriggerable Pulse timer begins on the first leading low to high change of the input, and runs for the time specified, but is restarted on any further low to high change of the input.

The On Delay is a positive edge triggered pulse that starts after the Time Period. It remains true until the Input goes False or is Reset.

The On Delay with Memory is a positive edge triggered latching timer that requires use of the Reset input before starting another cycle.

The Off Delay will be true when the input goes true and will remain there until the Time Period after the Input goes to false. The Reset will reset the output.

A Free Running timer triggers itself (continuous running). The Time Period specifies the on and off times of the wave form. The Reset will reset the output and stop the timer.

The Minimum On timer will remain on for the time specified by the Time Period when the Input goes true. The Reset has no action.

The Minimum Off timer will remain off for the time specified by the Time Period when the Input goes false. The Reset has no action.

The Cancelable Pulse timer will be on when the input goes to on, and will remain on until the Input goes to false, or until the Time Period expires. The Reset will turn the output off.

The Two State Digital Output object defines a minimal set of functions and attributes that represent the externally visible characteristics of a physical Two State Digital Output point. This object provides a means to interface to the physical output hardware on the device that it is running on and is not normally visible by the user.

The output signal is generated in terms of Active or Inactive. The output signal varies its pulse duration from zero to continuously Active. The object includes methods for polarity adjustment, runtime totalization, and pulse counting.

The Two State Digital Input object defines a minimum set of functions and attributes that represent the externally visible characteristics of a physical Two State Digital Input point. This object provides a means to interface to the physical input hardware on the device that it is running on and is not normally visible by the user.

The input signal must remain in a state, either Active or Inactive, for a debounce time for the object to report a change. The actual debounce time used by this object is the whole number multiple of input/output update time for the device that it is running on. The debounce value is received from a software object that it is connected to.

The Access object provides a collection of methods to each User Interface (UI) for verifying password entries and deriving a user's level of functional capability with regards to specific object categories. One of these objects is provided within each UI device. This is done to ensure that network traffic related to a UI's need of various Operator and Access Key objects is managed as efficiently as possible.

An Operator object is created and maintained for each non-administrator designated individual requiring access to a site through one or more networked devices. (This individual will also be referred to as the user.) Each Operator object maintains an operator's encrypted password and operator ID required by the user access feature before entry can be granted to a system. The creation, modification and deletion of this object may only be performed by the site administrator(s).

Each Access Key Object assigned to an operator dictates access privileges to and functional capabilities over a predefined collection of objects when access is attempted from the one or more user interfaces identified in the access key object. One or more keys can be assigned to each operator object. The creation, modification and deletion of these objects may only be performed by the site administrator(s).

The Analog Alarm object provides the alarming capability for an Analog Input or any analog value. The Analog Alarm object provides an alarm signal if the Input is outside the limits around a reference value. The High_Alarm_Limit is determined by the addition of the High_Alarm_Offset to the Reference value. The Low_Alarm_Limit is determined by the addition of the Low_Alarm_Offset to the Reference value. Also, once the object is in Alarm (either HIGH_ALARM or LOW_ALARM), the Input value must deviate from the Limit by a value greater than the Differential before it will return to NORMAL. A Delay_Time is also applied on a transition from NORMAL to HIGH_ALARM or LOW_ALARM. If an alarm condition is created due to a change in the Reference, it must remain for a period greater than the Delay_Time before it is reported. Alarm suppression during startup or other large Reference changes will be handled outside of this object.

The Analog Totalization object integrates analog attribute values over time. The Analog Totalization object records the usage of any consumable monitored by an analog attribute. Examples of consumable are electricity, steam, and chilled water. The analog totalization algorithm is as follows:

Present_Value = Present_Value + (Input × Period)/(TimeFactor × Scale_Factor)

| Where: | TimeFactor | = 1 | for a Time_Base of seconds |
|---|---|---|---|
| | | = 60 | for a Time_Base of minutes |
| | | = 3600 | for a Time_Base of hours |

For example, if the Present_Value is in units of gallons per minute, the Time_Base is minutes and TimeFactor will be 60.) The object supports a Preset value which may be specified to allow the totalization to continue from where it was before a device download. A Full_Scale value may also be specified which stops the totalization when reached.

Figure 9:
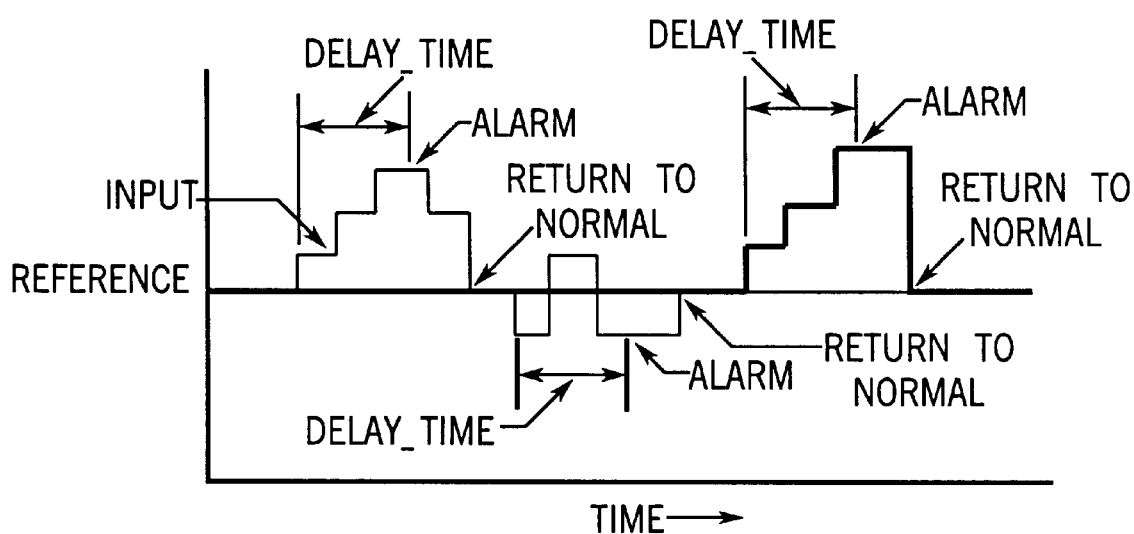
FIG. 9 illustrates a delay time being applied on a transition from a normal condition to an alarm condition in a Multistate Alarm object.

The Binary Alarm Object provides the alarming capability for a Binary Input, Binary Output or any Boolean value with respect to a difference from a defined normal condition (Reference attribute). The Binary Alarm object will sign up for a COV to the Input_Ref and store the value in the Input attribute. The Input attribute is compared to the value of the Reference attribute each time a COV report is received or the Reference attribute is changed. When the Input attribute value matches the Reference attribute value, the Present_Value attribute is set to NORMAL. If the two values do not match, the Present_Value attribute is set to ALARM. As seen in FIG. 9, a Delay_Time is also applied on a transition from NORMAL to ALARM. If an alarm condition is detected, it must remain for a period greater than the Delay_Time before it is reported.

The Calendar object maintains a list of dates designated as exceptions to the normal schedule. A Schedule object working off a chosen Calendar, will read the Present Value of the Calendar object to determine if the current day is within the Date List of the Calendar. The Calendar object allows for the scheduling of events up to two years in advance.

The Demand Limiting Load Rolling (DLLR) Controller object provides a method to reduce electric utility expenses by selectively shedding (i.e., the process of turning off equipment) electrical loads. Demand Limiting shaves off electrical demand peaks in a building's demand profile. Load Rolling reduces the overall demand profile.

The DLLR Controller object determines the necessary power reduction to meet the specified demand target. Power reduction is accomplished by shedding loads. The DLLR Controller works in conjunction with DLLR Load objects. There is a DLLR Load object for each shedable load. The DLLR Controller object manages the shedding and restoring of the electrical loads associated with the various DLLR Load objects in the system. Shedding loads is done by advising the associated DLLR Load objects to turn Off their associated outputs. This, in turn, results in the desired electrical demand reduction.

One DLLR Load Object exists for each managed electric power consuming piece of equipment. The DLLR Load object receives a Shed_Load command from the DLLR Controller object and takes immediate actions to turn Off its associated output, which then leads to the actual physical load shedding, causing the desired power reduction. The DLLR Load object is responsible for monitoring the conditions that require the load to be released. The request to release a load can also come from outside of the DLLR Load. The DLLR Load object provides a comfort override option.

The Event Totalization object counts events or pulses over time. The Event Totalization object records a total for the number of transitions made by a binary or multistate attributes. The object can be set up to totalize the event for a particular state reference or for multiple states of a multistate attribute. The event totalization algorithm is as follows:

$$Present\_Value = Present\_Value + (Value\_Per\_Pulse/Scale\_Factor)$$

The object supports a Preset value which may be specified to allow the totalization to continue from where it was before a device download. A Full_Scale value may also be specified which stops the totalization when reached.

The Group object provides the ability to customize the organization of the objects in the system. These groups are then available to the user interface devices for browsing or display. A Group object may reference any collection of objects including other groups. An object may be associated with multiple groups (i.e., a single object in the system may be referenced by more than one group). By nesting groups inside other groups, a system hierarchy can be built. The Group Object is a container for references to objects called 'Members'. The Members of a Group can be Applications, Assemblies and Standard Objects, including other Group objects. There is no limit to the number of Members in a Group or the levels of nesting. Therefore, the Group object provides a means to build multiple custom hierarchies for different user types or system tasks. Each member of a Group object can optionally have a label associated with it. This label allows a shorter name to be used when displaying the members in the group. It is also intended to reflect the object's meaning relative to the group that it is in.

The Heavy Equipment Controller (HEC) object provides a method to prevent large peaks in electrical demand caused by the simultaneous starting of multiple electrical loads. Various objects in the system (e.g., the Binary Output Software object) include a Heavy Equipment Delay (HED) attribute that specifies the time delay value required before the succeeding (i.e., next) load can execute it's start command. This is based on the demand requirements incurred by this load. The actual delay length is determined by the HEC object given this attribute value. If the pending start of a piece of equipment canceled, the associated delay is also canceled.

When an object with a Heavy Equipment Delay receives a Start or On request, it sends its HED value to the HEC. The HEC adds the HED value to its current accumulated delay and returns the new delay value. The request to Start is not issued to the output until the delay expires. The call to the HEC update command will pass the heavy equipment delay value to the HEC object. The HEC object will return the value of the accumulated delay. The calling object will use the returned value as the amount of delay before resumption of command processing. The accumulated delay value of the HED is decrement each second.

The Integrator object translates third-party objects and applications into architecture compatible objects and applications. The Integrator object is primarily used to map third party devices which conform to an approved or de-facto standard and which are specified by our customers for reasons associated with "vendor independence", "interoperability" or "open systems". System access to objects is hardware independent. That is, the interface to the system is generic so applications do not need to know what kind of hardware the object resides in.

Integrator objects are two-way software gateways. When connecting to Standard Objects, the existence of Integrator objects is transparent to the system user. They are embedded into Standard Object subtypes by the tool. For example, a third-party Analog Input object may be made to look like a Analog Input Software object by embedding the Integrator object as a method into a Standard Analog Input object subtype. Also, a generic Integrator object may stand alone when connecting to a third-party system. This type of Integrator object will support the desired protocol conversion. The tool is used to create the mapping to third-party systems or objects.

Integrator objects may reside in any device that has the appropriate software and hardware driver to communicate with the third-party device using its particular communication protocol and data structure. Each instance of an Integrator object will contain a table to map the attributes and parameters of one standard to another.

Integrator objects will be classified according to the third party communication protocol and data structure. For example, For third party devices which conform to a published data format standard, the attribute mapping table will be built using only the approved data types and will conform to approved profiles or standard data set templates if available. There will typically be one Integrator object for each object class (e.g., Object, Application, Profile or Template).

The methods of the Integrator object will also be embedded in Standard Object subtypes (i.e., a Standard Analog Input object with third-party Integrator methods). The method or logic process of the object will be the acquisition and transmission of data for its attributes using the given third party device communication protocol. An Integrator object may be used as a component of an Assembly or Application objects and its attributes may be connected to other object attributes or referenced within the logic of the container object.

As a two-way gateway, the inputs may be from either a Third-Party or Standard Object device. Likewise the outputs may connection to either a Third-Party or Standard Object device as indicated. This object provides input/output message handling, protocol conversion, data type conversion, naming conversion, third-party input/output message handling and error handling. Media conversion and any associated media bridging and/or routing is handled outside of the Integrator object (hardware).

Input Values: The name of the Standard Object input attributes to the object.

Output Values: The name of the third-party output attributes of the object.

Message Handling: This process generates output messages and accepts input messages. The input/output and message handling options are defined by the Common Object specification and each Standard Object specification.

Third-Party Message Handling: This process generates output messages and accepts input messages in accordance with the third-party system specifications (defined by others).

Conversion Table: This table defines the naming and data type conversions required for each input/output. For each Standard Object input/output name reference, this table defines the conversion to the name(s) and data type(s) used in the third-party output name reference. Duplicate names indicate that the data type has more than one value (e.g., there must be an output for each input value).

Naming Conversion: This process converts a name from one system convention to another. For example, ASCII names are converted to enumerated strings.

Data Type Conversion: This process converts a value data type from one system convention to another. When desired, it also separates multiple value data types into individual attribute values.

Setup: Selects the desired third-party protocol support of the object.

Reliability: Upon an error within the object, this attribute is updated with the error state enumeration.

Input Values (Third-Party): The name of the third-party input attributes to the object.

Output Values (Third-Party): The name of the third-party output attributes of the object.

The Interlock object provides a method for source objects to issue one or more commands to destination objects depending upon a source object's condition(s). When a specified set of source object conditions change, a specified series of commands are issued to the one or more destination objects.

The Interlock object supports the testing of logical expressions that may include inputs from multiple objects. This object issues multiple commands to multiple objects upon a transition to true and another set of commands upon a transition to false.

The Multistate Alarm object provides the alarming capability for a Multistate Input or any Multistate value with respect to a difference from a defined normal condition (Reference attribute). The Multistate Alarm object will sign up for a COV to the Input_Ref and store the value in the Input attribute. The Input attribute is compared to the value of the Reference attribute each time a COV report is received or the Reference attribute is changed. When the Input attribute value matches the Reference attribute value, the Present_Value attribute is set to NORMAL. If the two values do not match, the Present_Value attribute is set to ALARM. As seen in FIG. 10, a Delay_Time is also applied on a transition from NORMAL to ALARM. If an alarm condition is detected, it must remain for a period greater than the Delay_Time before it is reported. Delay_Time is also activated when the reference value changes.

The Notification object sends reports to the Message Router on the associated device. The report includes the associated message text, source ID, attribute value, date & time stamp, status and reliability. This object typically works in conjunction with objects that pass information to user interface devices (e.g., the Analog Alarm object).

The Optimal Start/Stop object provides a new method for automatically adjusting the start/stop times of heating and cooling equipment for near-optimal performance. By specifying the desired occupancy duration, occupied space temperature setpoint, and unoccupied space temperature setpoint, the Optimal Start/Stop object determines the Start and Stop times for the heating and cooling systems. Minimum and maximum Start and Stop times may be specified.

The Optimal Start/Stop object algorithm includes automatic deadtime and building constant adaptation. The deadtime calculation determines the number of minutes required to raise or lower the space temperature by one degree. The building constant calculation determines the number of minutes required for the space temperature to reach the setpoint. These adaptations are performed for both heating and cooling. The optimal start time calculation is only performed if the current mode of the system to be optimally started (e.g., heating or cooling) matches the specified type of optimal start specified by the OST_Type attribute (i.e., Heating, Cooling or Both Heating & Cooling). The deadtime and building constant adaptation calculations are only performed if Adaptation is enabled, the outdoor air temperature is within the design constraints, and the initial zone temperature is not within differential of zone setpoint plus one degree (for deadtime).

The Printer object provides a means to send system information to a hard-copy device (e.g., reports generated by objects or features). The Printer object is responsible for the buffering of output to the hard-copy device. The Printer object routes messages to devices connected directly or by dialup. The Printer object system reports from being printed in the middle of a summary page.

The Pulse Totalization object counts pulses made by binary attribute values over time. The Pulse Totalization object records the number of transitions made by a binary input. An Edge_Trigger attribute specifies the input contact conditions to totalize on (i.e., leading edge, falling edge, or count both edges). The pulse totalization algorithm is as follows:

Present_Value=Present_Value+(1/Scale Factor)

The object supports a Preset value which may be specified to allow the totalization to continue from where it was before a device download. A Full_Scale value may also be specified which stops the totalization when reached.

The Query object provides a means for filtering and collecting objects and object attribute values from throughout the system. The Query object serves the requesting application with a list of objects and the associated attribute values that satisfied the Query's filter.

The Query object supports Standard and Involvement queries. The Standard query locates objects that satisfy the query filter criteria. The Involvement query locates objects that have a specified relationship with objects that satisfy the query filter criteria.

A query is executed using a Broker/Agent method. The Query object is considered to be the Broker. When a query is executed, the Broker creates and manages the dissemination of multiple Query Agent objects to remote locations in the system. Each Query Agent object gathers the data according to its assigned subset of the overall system. Each Query Agent object then returns its query results to the Broker (i.e., the Query object).

The Rate Calculator object monitors its input attribute and calculates a rate of change. The Rate Calculator object supports Event and Periodic sampling. For Event based sampling the rate of change calculation is performed each time the Input is updated by a change of value report. For Periodic sampling, the rate of change calculation is performed on a fixed interval.

For both sampling methods, each input is compared with the previous input to determine how fast the process variable is changing. If the input is noisy, a 3 point approximation is used for calculating the rate of change. The Rate Calculator object also keeps track of elapsed ticks between executions to calculate its exact period. The Scale attribute may be used to convert the rate of change to the value implied by the units attribute.

The Report Filter object defines the criteria by which reports (i.e., a system message) are qualified for delivery to system devices. This object consists of inclusive masks for the category and priority attributes associated with each report and report destination.

The Report Filter object is used by the report routing methods of the system. A "report" is any system message. Each messages includes a priority (e.g., Normal, Critical) and category (e.g., Security, HVAC). The Report Filter object specifies the destination(s) of messages according to their specified priority and category. Each report destination contains a Report Filter object reference attribute which defines the set of categories and priorities available to the device. Offline notifications are also managed by this object to prevent messages from being lost.

The Runtime Totalization object integrates time while the Input object's value matches a specified State. The Runtime Totalization object records time for binary or multistate attributes. The State attribute specifies the contact condition to totalize on. The runtime totalization algorithm is as follows:

$$\text{Present\_Value} = \text{Present\_Value} + \text{Period}/(\text{TimeFactor} \times \text{Scale\_Factor})$$

Where: TimeFactor = 1 for a Time_Base of seconds
= 60 for a Time_Base of minutes
= 3600 for a Time_Base of hours For example, if the Present_Value is in units of minutes, the Time_Base is minutes and TimeFactor will be 60.) The object supports a Preset value which may be specified to allow the totalization to continue from where it was before a device download. A Full_Scale value may also be specified which stops the totalization when reached.

The Schedule object sends a series of commands to objects according to the time of day. The Schedule object obtains time and date information from the Calendar and Site objects.

The Schedule object processes all incoming Changed Attribute and Read Response messages. The Schedule object receives periodic messages (containing the current time) from the Site object. The time is used to determine if any commands need to be scheduled at the current time. The Schedule object internally stores the last value for current time it received. If the system time was advanced or set back, then the Fast Clock method is called. If the date changed, no special processing is performed. The Fast Clock method will evaluate the times scheduled for the current day from midnight to the current time, to send the last commands (if any) which were scheduled.

The Serial Data Link Layer SDLL object allows a device to communicate through any one of its serial ports to remote devices, such as workstations, printers, VT-100 terminals, fax machines or pagers. The SDLL handles direct serial connections between devices (e.g., controller to printers, terminals, and workstations), and it handles dial-up connections between devices (e.g., controller to printers, terminals, pagers, fax machines, and workstations). This object also allows for connection to third-party integration devices.

The SDLL object provides support for establishing a connection (direct or dial-up), terminating a connection (direct or dial-up), life-check on the remote device, communication error detection, gathering communication statistics, and user data flow control. The SDLL object interfaces to tasks that support user data message segmentation, user data message prioritization, user data compression, port testing, user ID and password verification/intruder detection, initiate establishing a connection, initiate terminating a connection, and convert data into a different data format (i.e., data conversion to a format that is understood by the receiving device, such as terminals, printers, fax machines, and pagers).

The Site object is responsible for the synchronization of Global objects, Clock time synchronization, and device status monitoring within the site. A master Site object must be configured for each site (e.g., university campus). A copy of the master Site object is globally disseminated to all devices configured on the site (i.e., the Site object is a redundant object).

The Site object also manages Administrator access to the system. The Administrator designation provides a user with unrestricted access to and control over all objects distributed throughout a given site. The specifics concerning the individuals assigned this role are stored within the Site object. The existence of administrative passwords at each device is intended to ensure a means for gaining access to each of the networked devices should a network go down.

The Site object provides current time and date information on a one second basis for all functions (e.g., Weekly Scheduling) needing this data for execution. This object also provides automatic Leap year calculations based on current time and date information. Calculation of the current date is done at midnight of each day. A read response to a request for Time of Day to the Site object provides resolution to the second. The Site object is responsible for updating all Site objects on the site using the Time_Sync message. The Master Site object notifies all other Site objects when the time has been changed by a user command.

The Site object supports automatic Daylight Savings time adjustment. The Daylight_Savings_Enabled attribute must be set to true and then the user must enter the last day that Daylight Saving Time can begin and the last day that it can end. This is all the information needed by the Site object to calculate and execute the Daylight Savings Time/Standard Time adjustments. It automatically re-calculates the dates for DST/ST each year.

If the Site object is in a network which spans time zones, the Universal Coordinated Time Offset attribute specifies the time to be added to a time synchronization message to the object and is the time difference between the geographical location of the Site and the fixed system reference time of the network which is Greenwich Mean Time. The Standard_Time_Units and Daylight_Time_Units may be used to append the time stamp on summaries and reports within networks which span time zones. The time adjustment based on the Daylight Saving Time/Standard Time dates is provided when the logic is enabled at 2:00 AM on the specified date. Daylight Saving information is maintained in each device that has a clock and does not change unless done so by the user.

The Site object supports a time acceleration/deceleration method for application testing purposes. A Time_Scale_Factor value can be to adjusted to provide a system time update of one minute for every one second in normal time. This rate can also be slowed to provide a system time update of one second for every 60 seconds in normal time.

The Summary object supports the capability to execute standard and user defined summaries in the system. Standard Summaries are pre-defined at the development centers. These summaries may include—Offline, Unreliable, All Objects, etc. Standard summaries such as All Points/Objects, Offline Objects, etc. will be pre-defined in the system and therefore always available. From a system standpoint, a user defined summary may be added at one User Interface device and may be executed at a later time from another U/I device on the network.

User Defined Summaries are built by operators. These summaries allow the operators to define the selection criteria, including object name filters (e.g., all objects with the name *temp), attribute filters (e.g., all objects with their Offline attribute=False), the set of attributes that should be returned for each matching object;

and a title for the summary. User Defined Summaries can be either Permanent or Temporary. Permanent User Defined Summaries are saved in the system and can be executed at a later time from a U/I device on the network. Temporary User Defined Summaries are executed only when defined, that is, they are not saved in the system. One-shot summaries is another term used. Summaries can be output at display devices (e.g., VT100 terminal and Workstations) and can be sent to hardcopy devices (printers, faxes, etc.).

The Trend object monitors and records changes in the behavior of individual object attributes selected for monitoring. The Trend object includes methods to capture and temporarily store data for each object attribute being monitored in a device's buffer. The Trend object includes the specification of the data collection sampling method, sample interval, the data buffer size, the storage method, the trend buffer upload interval. Prior to buffer overflow, the Trend object uploads its data to designated intermediate storage devices. Typically the user is unaware of the upload of trend data to archived PC files unless file full alarms or data routing problems are encountered.

The sampling methods supported include Event Driven and Periodic. When attributes are being recorded on an Event basis, samples are taken when the attributes value has changed by a specified Change of Value Increment. For periodic sampling, samples are monitored on a Sample_Interval. For both Event and Periodic sampling, a Filter_Increment dictates which samples are placed in storage. If the Filter_Increment is set to zero, data will be stored for every Sample_Interval or event that occurs. Disabling a Trend object halts the data collection for all attributes currently being monitored within that individual object. Multiple Trend objects may sample the same object attribute. Disabling the object being monitored does not disable the data collection of the associated Trend objects. Each stored data sample includes the trended Attribute_Reference name, the value of the attribute, a date/time stamp, and the Reliability state of the data. The Trend object may reside standalone in a device or be used to manage the collection of attribute data for the Trend or History features.

The foregoing discloses and describes merely exemplary embodiments of the present invention. One skilled in the art will readily recognize from such discussion, and from the accompanying drawings and claims, that various changes, modifications and variations can be made therein without departing from the spirit and scope of the present invention.

We claim:

1. A computer-implemented building automation system for constructing applications that interact with building automation devices to perform building automation functions, comprising:

a standard object super class stored in a computer readable memory that defines a plurality of standard objects through instantiation such that said standard objects have attributes and methods predetermined physical relationships defined by physical laws associated with the building automation functions;

said standard objects further having at least a first communication method for retrieving attributes from another of said standard objects and a second communication method for transmitting attributes to another of said standard objects; and an application for performing a building automation function defined by at least two of said standard objects interconnected using said first and second communication method, such that said standard objects are selected from the group having an analog input object, an analog output object, an analog value object, a binary input object, a binary output object, a binary output sequencer object, a binary value object, a duration adjust output object, a device object, an electric heater sequencer object, a binary value object, a duration adjust output object, a device object, an electric heater sequencer object, a latch object, a multistate output object, a multistate value object, a P-adaptive object, a position adjust output object, a proportional integral derivative object, a pattern recognition adaptive controller object, a ramp object, a start object and a timer object.

2. The computer-implemented building automation system of claim 1 wherein said application being defined in an assembly object having attributes for storing data, a logic sequence and at least two of said standard objects without encapsulation of said standard objects, for performing at least one building automation function.

3. The computer-implemented building automation system of claim 1 wherein said application being defined in an application object having attributes for storing data, a logic sequence, and at least one of said standard objects and an assembly object, said assembly object having at least two of said standard objects without encapsulation of said standard objects, for performing at least one building automation function.

4. The computer-implemented building automation system of claim 1 wherein said application further comprises at least one standard object being selected from the group having an access object, an analog alarm object, a binary alarm object, a calendar object, a clock object, a group object, a history object, an integration object, an interlock object, a migration object, a notification object, a query object, a schedule object, and a trend object.

5. The computer-implemented building automation system of claim 1 wherein said first communication method associated with a first standard object for receiving a message, requesting the values for at least one of said attributes of said first standard object and transmitting a second message formatted with the values of said attributes, said first communication method being defined through inheritance from said object superclass.

6. The computer-implemented building automation system of claim 1 wherein said second communication method associated with a first standard object for receiving a message formatted with values of at least one of said attributes of said first standard object and updating said attributes of said first standard object with the values of said attributes, said second communication method being defined through inheritance from said standard object superclass.

7. The computer-implemented building automation system of claim 1 further comprising:

a source standard object for performing a first control method, having a first control attribute that may change based on said first control method and a reporting method for transmitting a message containing the value of said first control attribute in response to a change in the value of said first control attribute, said reporting method being defined through inheritance from said standard object superclass;

a destination standard object for performing a second control method, having a second control attribute for use by said second control method whose value is connected to said first control attribute; and a connection object for establishing a connection between said source object and said destination object, having a linking method for registering said second control attribute of said destination object with said source object, and a writing method for providing the value of said first control attribute to said second control attribute of said destination object in response to receiving said message from said source object, said linking method and said writing method being defined through inheritance from said standard object superclass.

8. A computer-implemented building automation system for construction applications that interact with building automation devices to perform building automation functions, comprising:

a standard object superclass stored in a computer readable memory that defines a plurality of standard objects through instantiation such that said standard objects have attributes and methods pertaining to predetermined physical relationships defined by physical laws associated with the building automation functions;

said standard objects further having at least a first communication method for retrieving attributes from another of said standard objects and a second communication method for transmitting attributes to another of said standard objects; and an application for performing a building automation function defined by at least two of said standard objects interconnected using said first and second communication method for transmitting attributes to another of said standard objects; and an application for performing a building automation function defined by at least two of said standard objects interconnected using said first and second communication method, such that said standard objects are selected from the group consisting of an access object, an analog alarm object, an analog input object, an analog output object, an analog value object, an assembly object, an application object, a binary alarm object, a binary input object, a binary output object, a binary output sequencer object, a binary value object, a calendar object, a clock object, a connection object, a duration adjust output object, a device object, an electric heater sequencer object, a group object, a history object, an integration object, an interlock object, a latch object, a migration object, a multistate output object, a multistate value object, a notification object, a P-adaptive object, a position adjust output object, a PID object, a pattern recognition adaptive controller object, a query object, a ramp object, a schedule object, a start-stop object, a timer object and a trend object.

* * * * *

UNITED STATES PATENT AND TRADEMARK OFFICE
CERTIFICATE OF CORRECTION

PATENT NO.    : 6,119,125
DATED         : September 12, 2000
INVENTOR(S)   : Jeffrey J. Gloudeman It is certified that error appears in the above-identified patent and that said Letters Patent is hereby corrected as shown below:

Column 27,
Line 44, please delete "super class" and insert therefore -- superclass --.
Line 47, before "predetermined", please insert -- pertaining to --.
Lines 64-66, please delete "a binary value object, a duration adjust output object, a device object, an electric heater sequencer object,".

Column 28,
Lines 1-2, please delete "proportional integral derivative" and insert therefor -- PID --.
Line 3, please delete "start" and insert therefor -- start-stop output --.

Column 29,
Lines 14-18, please delete "an application for performing a building automation function defined by at least two of said standard objects interconnected using said first and second communication method for transmitting attributes to another of said standard objects; and".

Signed and Sealed this

Ninth Day of April, 2002

Attest:

Attesting Officer

JAMES E. ROGAN
Director of the United States Patent and Trademark Office